United States Patent [19]

Engelsberger et al.

[11] 4,434,580
[45] Mar. 6, 1984

[54] DOOR, ESPECIALLY FOR MOTOR VEHICLES

[75] Inventors: Ernst Engelsberger, Glonn; Ralf-Thilo Schulz, Putzbrunn, both of Fed. Rep. of Germany

[73] Assignee: Messerschmitt-Boelkow-Blohm Gesellschaft mit beschraenkter Haftung, Munich, Fed. Rep. of Germany

[21] Appl. No.: 334,641

[22] Filed: Dec. 28, 1981

[30] Foreign Application Priority Data

Jan. 24, 1981 [DE] Fed. Rep. of Germany ....... 3102328

[51] Int. Cl.³ .............................................. B60J 5/04
[52] U.S. Cl. ...................................... 49/502; 296/146
[58] Field of Search ......................... 49/502; 296/146

[56] References Cited

U.S. PATENT DOCUMENTS

| 3,700,076 | 10/1972 | Forsting et al. | 49/502 X |
| 3,868,141 | 2/1975 | Johnson | 49/502 X |
| 4,300,315 | 11/1981 | Holzwarth | 49/502 |
| 4,306,381 | 12/1981 | Presto | 49/502 |

FOREIGN PATENT DOCUMENTS

| 1480089 | 8/1969 | Fed. Rep. of Germany | 49/502 |
| 2410228 | 9/1974 | Fed. Rep. of Germany | 49/502 |

*Primary Examiner*—Kenneth Downey
*Attorney, Agent, or Firm*—W. G. Fasse; D. H. Kane, Jr.

[57] ABSTRACT

The present car door has an interior panel forming simultaneously a frame, and an exterior panel. Hinges and a lock base plate are secured to the frame. Two supporting rails are pivotally secured to the frame. One rail extends substantially horizontally between the upper hinge zone and the lock base plate. The other rail extends at an angle relative to the one rail from the lower hinge zone to the lock base plate. A cable which is expandable in a nonreversible manner extends at least along one of the rails, preferably along the horizontal rail. The cable has a loop at each end. A bolt which also journals the respective rail end to the frame extends through the respective loop of the cable.

7 Claims, 1 Drawing Figure

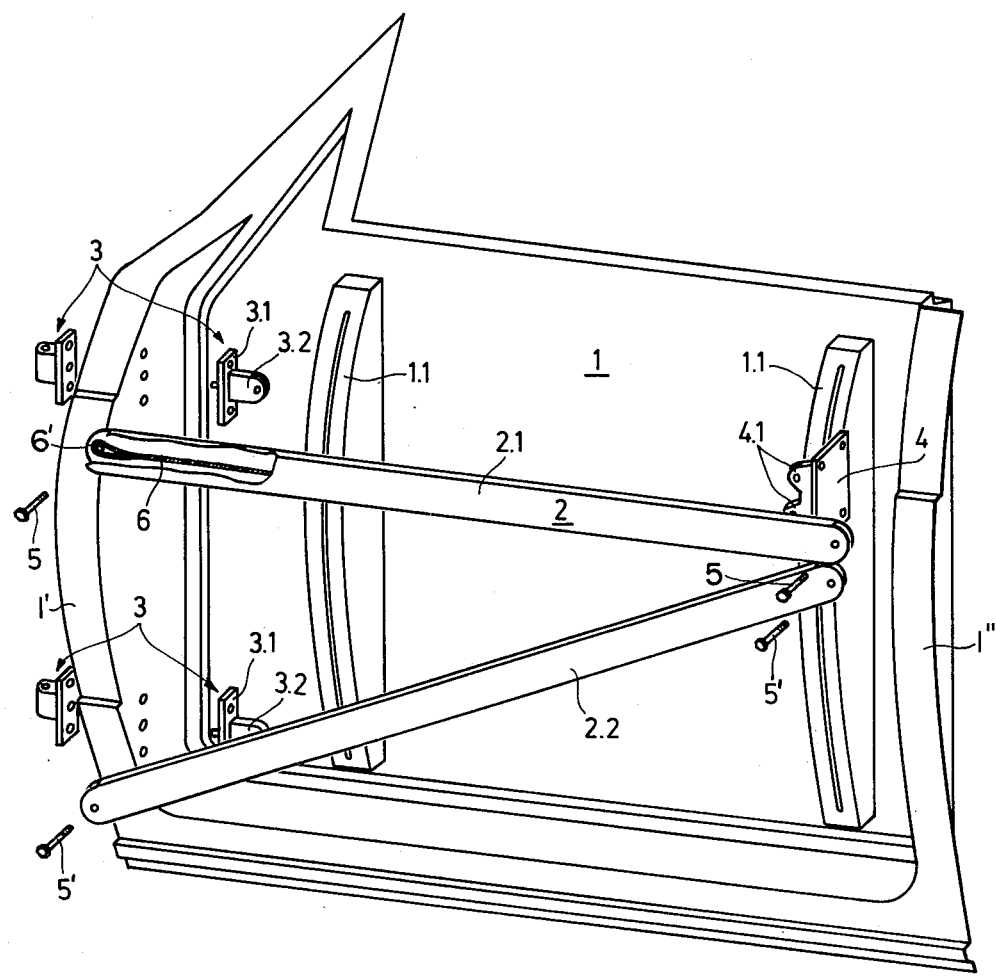

DOOR, ESPECIALLY FOR MOTOR VEHICLES

CROSS-REFERENCE TO RELATED APPLICATION

The present application is based on German Serial Number p 3,102,328.0, filed in the Federal Republic of Germany on Jan. 24, 1981. The priority of the German filing date is claimed for the present application.

BACKGROUND OF THE INVENTION

The present invention relates to a door especially for motor vehicles. Such doors may comprise two rails extending at an angle relative to each other, for example, in a V-shape or in a Y-configuration. The reinforcing rails extend between the hinging means arranged on one vertical side or frame member of the door and a lock base plate secured to another vertical member of the door frame. Thus, one reinforcing rail extends substantially horizontally from an upper hinge zone to the lock base plate while the other reinforcing rail extends at an angle from a lower hinge zone to the lock base plate. These rails form a central door structure to which interior and exterior door panels may be secured.

German Patent Publication (DE-AS) No. 1,480,089 discloses a door of this type, for example. Such a door has the advantage, among others, that the interior and exterior door components such as covering panels may be made of synthetic material and solely with regard to the covering function without regard to any load carrying. Thus, a substantial weight reduction may be accomplished however at the expense of a reduction in the door strength. Therefore, this prior art type of door is not capable of satisfying without more, the requirement for an optimal reduction in the danger risk to passengers in a car equipped with such doors when these doors are exposed to a lateral impact as a result of an accident.

OBJECTS OF THE INVENTION

In view of the above it is the aim of the invention to achieve the following objects singly or in combination:
- to increase the deformation resistance of a door of a type described above without giving up the advantage of constructing these doors from synthetic materials and in a lightweight type of structure;
- to reinforce the door by relatively lightweight components capable of taking up energy in a nonreversible manner; and
- to reduce the danger risk to passengers as compared to prior doors of this type.

SUMMARY OF THE INVENTION

According to the invention there is provided a door especially for motor vehicles which is characterized in that the reinforcing rails are pivoted or journalled at each end to the respective hinge means which in turn are secured to a vertically extending door frame member and that the opposite end of the reinforcing rails is hinged or journalled to a door base plate. Further, a cable or rope which is stretchable in a non-reversible manner is arranged to extend in parallel to at least one of the reinforcing rails, whereby the ends of the cable or rope are secured to the journal pins which secure the respective reinforcing rail.

This structure according to the invention has the advantage that the two rails due to the journalling of their ends are movably mounted in position so that the rails due to their ability to move are substantially free of deformation under load conditions until the break load or break stress is reached. Additionally, when the break stress of the rail or rails is reached, the rope or cable makes sure that the central door portion acts as an energy absorbing impact buffer. By making the rails of hollow sectional stock it is possible to run the rope or cable inside the respective rail so that no additional space is required for the installation of the rope or cable and a compact type of structure is maintainedl

BRIEF FIGURE DESCRIPTION

In order that the invention may be clearly understood, it will now be described, by way of example, with reference to the single FIGURE which shows a perspective view of the interior door structure according to the invention with the exterior covering panel removed.

DETAILED DESCRIPTION OF A PREFERRED EXAMPLE EMBODIMENT AND OF THE BEST MODE OF THE INVENTION

The exploded view shows a front door of a passenger car whereby only the interior door component 1 is shown whereas the exterior door component or panel is omitted to expose the interior of the door. The interior door component 1 comprises vertical frame members 1' and 1". A central door component 2 is formed by two reinforcing rails 2.1 and 2.2. The central door component 2 carries the outer covering panel not shown but secured in a conventional manner to the central door component 2. The exterior door panel may be constructed as a metal skin covering which is not required to take up any loads. The rails 2.1 and 2.2 simultaneously carry the interior door component or panel 1 since the rails are connected to the vehicle frame (not shown) through the hinges 3 as will be described in more detail below. The interior door component 1 may be constructed as a covering panel which is also not required to take up any substantial loads. The interior door component 1 may be provided with guide rails 1.1 and 1.2 for guiding a door window or the like. The interior door panel may be made of synthetic material which is heat moldable. If required, the interior door component or panel 1 may be made of a fiber reinforced compound material preferably employing glass fibers as the reinforcing fibers.

The force tranmitting, supporting central door component or structure 2 comprises the above mentioned rails 2.1, 2.2 extending at an angle relative to each other between the door hinges 3 and the lock base plate 4. The rails 2.1 and 2.2 are made of fiber reinforced synthetic compound material in which the fibers are oriented to extend in the longitudinal direction of these rails. Preferably, the rails are made as rectangular hollow sectional stock to provide the required strength and stiffness characteristics. First journal means in the form of pivot or journal bolts 5 secure the upper rail 2.1 to the counter plate 3.1 of the upper hinge and to the base plate 4 of the lock. Second journal means in the form of journal or pivot bolts 5' secure the lower rail 2.2 to the counter plate 3.1 of the lower hinge and to the lock base plate 4. For this purpose the hinge base plates 3.1 are provided with extension brackets 3.2 each having a respective threaded hole for the bolts 5, 5'. Similarly, the lock base plate 4 is provided with lugs 4.1 also having threaded holes for the respective bolts 5, 5'. The holes at the ends of the rails 2.1 and 2.2 may be reinforced by a respective laminated fiber webbing to take up the bearing pressure of the bolts 5, 5' when the latter extend through these holes at the ends of the rails 2.1 and 2.2. Due to this type of connection of the rails to the door hinges and to the lock base plate, it becomes possible to fully utilize the high specific stiffness and structural strength of these fiber reinforced synthetic sectional components in which the reinforcing fibers extend uni-directionally. The rails 2.1 and 2.2 actually form struts which are subject to tension and/or pressure loads in such a manner that a bending of these rails takes place prior to their destruction when an impact load is applied, for example, a so-called crash load.

According to the invention the rails are further reinforced by at least one rope or cable 6 which is irreversibly stretchable and which extends alongside or in parallel to at least one of the rails such as the rail 2.1.

The rope or cable 6 is provided at each end with a closed loop 6' through which the respective bolt 5, 5' extends. The rope or cable is preferably made of polyamide fiber material. The rail is provided at each end with an opening through which the respective bolt may extend for passing through the cable loop 6'. If desired, both rails may be equipped with such a rope or cable which in a preferred embodiment extends centrally and longitudinally inside the respective rail.

Even if only the upper rail 2.1 is equipped with a rope or cable 6 as described, the central door section of the door becomes effective as an impact buffer. This is so because when the rail breaks in response to an impact stress the rope or cable will be lengthened in an irreversible manner. This shock or impact absorbing function is further improved by providing both rails with a rope or cable as described.

In view of the foregoing it will be appreciated that a substantial contribution has been made to a lightweight autobody construction while reducing the risk of danger for the passengers of a vehicle as compared to prior art structures of this type.

Although the invention has been described with reference to a specific example embodiment, it will be appreciated, that it is intended, to cover all modifications and equivalents within the scope of the appended claims.

What is claimed is:

1. A door, especially for a motor vehicle, comprising door frame means including vertically extending frame members, hinge means operatively secured to one frame member of said vertically extending frame members, a lock base plate operatively secured to the other frame member of said vertically extending frame members, a first substantially horizontally extending rail (2.1) having a longitudinal axis, first journal bolt means (5) for journalling said first rail with one end thereof to a respective one of said hinge means and with the other rail end to said lock base plate, a second rail (2.2) extending at an angle to the first rail, second journal bolt means (5') for journalling said second rail with one end thereof to the respective other hinge means and with the other rail end also to the lock base plate, said first and second journal bolt means (5, 5') extending also substantially horizontally and perpendicularly to the respective rail end for movably mounting the rail ends so that the first and second rails are substantially free of deformations under load condition until the brake stress is reached, and irreversibly expandable cable means secured with their/ends to said first journal means whereby said cable means extend substantially in parallel at least to said first rail.

2. The door of claim 1, wherein said cable means are formed into a closed loop at each end thereof, said first journal means extending through said loop at each cable end.

3. The door of claim 1 or 2, wherein at least said first substantially horizontally extending rail is a hollow rail and wherein said cable means extend longitudinally inside said hollow rail.

4. The door of claim 1 or 2, wherein said first and second rails are made of fiber reinforced synthetic material, in the form of a rectangular hollow section, and wherein the reinforcing fibers extend substantially in the longitudinal direction of the rectangular hollow section.

5. The door of claim 1 or 2, wherein said cable means comprise a rope of synthetic fibers.

6. The door of claim 5, wherein said synthetic fibers of the rope are made of polyamide synthetic material.

7. The door of claim 1 or 2, wherein an irreversibly expandable cabe extends in parallel to each rail.

* * * * *

UNITED STATES PATENT AND TRADEMARK OFFICE
CERTIFICATE OF CORRECTION

PATENT NO. : 4,434,580

DATED : March 6, 1984

INVENTOR(S) : Ernst Engelsberger; Ralf-Thilo Schulz; Franz Drachenberg

It is certified that error appears in the above-identified patent and that said Letters Patent is hereby corrected as shown below:

On the title page Inventors should read

--[75] Inventors: Ernst Engelsberger, Glonn;
Ralf-Thilo Schulz, Putzbrunn;
Franz Drachenberg, Baldham, all three
of Fed. Rep. of Germany--.

In claim 1, line 22, "their/ends" should read: --their ends--.

Signed and Sealed this

Twenty-second Day of May 1984

[SEAL]

*Attest:*

GERALD J. MOSSINGHOFF

*Attesting Officer*  *Commissioner of Patents and Trademarks*